United States Patent Office 3,390,160
Patented June 25, 1968

3,390,160
PROCESS FOR THE PRODUCTION OF COMPLEX SALTS OF BIS-(O-HYDROXY-ARYL) SULPHIDES AND DIVALENT METALS
Karl-Heinz Heller, Moers, Joachim Nentwig, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed May 4, 1964, Ser. No. 364,812
Claims priority, application Germany, May 17, 1963, F 39,767
5 Claims. (Cl. 260—433)

ABSTRACT OF THE DISCLOSURE

Free bis-(o-hydroxyaryl)sulphide in specified molar solutions in a water-miscible inert organic solvent is mixed with salts of nickel, copper, cobalt or mercury in a water-miscible inert organic solvent or water of specified mols/liter with resultant direct precipitation of complex salts containing the metal and sulphide in a molecular ratio of 1:2.

The present invention is concerned with a process for the production of complex salts of bis-(o-hydroxy-aryl) sulphides and divalent metals.

It is known to produce from bis-(o-hydroxy-aryl) sulphides, in the usual manner, by double reaction of their alkali metal salts with water-soluble salts, especially sulphates, chlorides, nitrates and acetates, of various divalent metals such as zinc, copper, calcium, barium, mercury, iron, nickel and magnesium, the corresponding metal salts of the general formula:

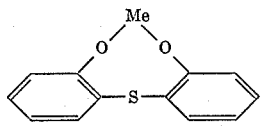

wherein Me is a divalent metal. 1 mol of bis-(o-hydroxyaryl) sulphide is thereby mixed in an aqueous solution, which may also contain alcohols such as isopropanol, with an aqueous solution of 2 mols alkali metal hydroxide and, thereafter, with an aqueous solution of 1 mol of the metal salt concerned, whereupon the desired salt often separates out as a precipitate, or the bis-(o-hydroxy-aryl) sulphides are mixed in an anhydrous alcoholic solution with alcoholic solutions of the metal salts and of the corresponding alkali metal alcoholates. The desired salts are thereby obtained by evaporation of the filtered solutions.

It is also known that from 2,2'-dihydroxy-5,5'-(1,1,3,3-tetramethylbutyl)-diphenyl sulphide and nickel there is obtained a complex salt of the general formula:

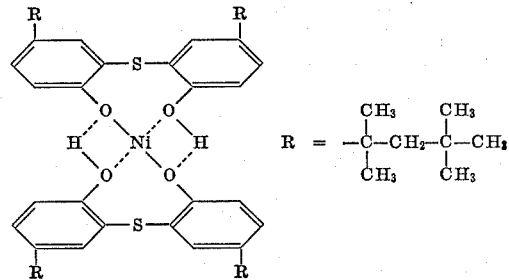

when 1 mol of the mentioned dihydroxy-diaryl sulphide is reacted as stated above, but with 0.5 mol of a nickel salt and 1 mol of an alkali metal hydroxide or alkali metal alcoholate. However, there is a risk that the reaction does not proceed to completion so that the complex salt obtained is still contaminated, inter alia, by unreacted reaction components, especially by alkali.

This defect is avoided if, according to another proposal, solutions of bis(o-hydroxyaryl) sulphides and nickel acetate tetrahydrate are heated in aromatic hydrocarbons, for example, xylene, whereby the acetic acid liberated from the nickel acetate distills off azeotropically. This process is, however, laborious and necessitates a considerable technical expenditure.

Finally, it has already been described that by combination of a very dilute alcoholic solution of 2,2'-dihydroxy-5,5'-dichlorodiphenyl sulphide with a likewise very dilute aqueous solution of a fivefold excess of copper sulphate, precipitates might be obtained which are designated as complex compounds but not more precisely defined. This reaction, however, is said to be only possible in the case of halogen-substituted dihydroxy-diphenyl sulphides in which the halogen substituents render the compound more negative thus causing an increased reactivity with the cupric ions, whereas halogen-free dihydroxy-diaryl sulphides are said to give precipitates only with copper salts in alkaline solution, the same large excess of copper salt nevertheless also being necessary. A working method of this kind cannot be considered for use on a technical scale.

We have now found that definite complex salts are obtained from nickel, copper, cobalt and mercury and bis-(o-hydroxy-aryl) sulphides, optionally alkyl-substituted, in a molecular ratio of 1:2, in a surprisingly simple manner without the use of alkali metal hydroxides and without azeotropically distilling off from the reaction mixture the acid liberated from the metal salt used, and also without the use of an excess of the divalent metal, in that the free bis(o-hydroxy-aryl) sulphides are dissolved in water-miscible, inert organic solvents and these solutions are mixed with solutions or suspensions of nickel, copper, cobalt or mercury salts of inorganic or organic acids in the mentioned solvents, or with aqueous solutions of these salts, optionally also adding water to the mixture obtained.

By using this method, the desired complex salts precipitate directly from the reaction mixture in outstanding purity and with high yields, most of them being in a crystalline state, and generally require no further purification. Especially good results are achieved by the reaction of metal acetates in methanolic solution since then, with the exception of copper acetate, especially favourable solubility conditions are present. The solubility of copper acetate in methanol is admittedly low, but this reaction can be carried out in suspension by prolonged boiling under reflux. Furthermore, the solubility of the copper compounds can be increased by the addition of approximately equivalent amounts of ammonia, although this is generally not necessary. The copper complex compounds are formed especially easily, not only with halogen-substituted thio-bis-phenols but, in particular, also with, for example, tetra-alkyl-substituted compounds of this type.

The solubility and the colour of the copper complex compounds are influenced in characteristic manner by various substituents, whereas the colour of the other complex compounds remains practically unaltered. Larger alkyl groups, such as the isooctyl group, or an aggregation of alkyl groups, bring about the solubility of the complex compounds in hydrocarbons, such as toluene. Negative substituents, such as chlorine, cause a yellow-brown colour of the complex compounds, whereas alkyl substituents cause, with increasing size and number, a colour shift towards brown-red-violet-black.

The complex compounds produced according to the process of the present invention can be used, for example, as biocidally-active substances, for example, as fungicides against rice fungi and leaf fungi, and also as insecticides against house flies and the larvae of the yellow fever mosquito.

Examples of inert organic solvents which are miscible with water include methanol, ethanol, propanol, acetone and dioxan.

Examples of salts of the divalent metals in question include the salts of nickel, copper, cobalt and mercury with organic carboxylic acids, such as acetic acid and propionic acid, as well as the chlorides, sulphates and nitrates of these metals.

Bis-(o-hydroxyaryl) sulphides which can be converted with advantage into the complex salts, according to the process of the present invention, are, for example, 2,2'-dihydroxy - diphenyl sulphide, 2,2' - dihydroxy-5,5'-dimethyl-diphenyl sulphide, 2,2'-dihydroxy-5,5'-diisooctyl-diphenyl sulphide, 2,2' - dihydroxy-5,5'-dicyclohexyl-diphenyl sulphide, 2,2'-dihydroxy-5,5'-diisopropyl-diphenyl sulphide, 2,2'-dihydroxy-5,5'-dichloro-diphenyl sulphide, 2,2' - dihydroxy-3,3'-dimethyl-5,5'-di-tert.-butyl-diphenyl sulphide, 2,2'-dihydroxy-3,3'-di-tert.-butyl-5,5'-dimethyl-diphenyl sulphide, 2,2'-dihydroxy-3,3',5,5'-tetramethyl-diphenyl sulphide, 2,2'-dihydroxy-3,3',5,5'-tetrachloro - diphenyl sulphide, 1,1'-bis(2-hydroxy-naphthyl) sulphide and 2,2'-bis-(1-hydroxy-4-chloronaphthyl) sulphide.

Complex compounds of this kind are not formed with other divalent metals, such as calcium, barium, cadmium, manganese, lead and zinc, and other dihydroxy-diaryl compounds, such as 2,2'-dihydroxy-diphenyl, 2,2'-dihydroxy-diphenyl-alkanes, 2,2'-dihydroxy - diphenyl sulphoxides and 2,2'-di-hydroxy-diphenyl sulphones.

The following examples are given for the purpose of illustrating the present invention:

EXAMPLE 1

17.7 g. (0.1 mol) cobalt acetate are dissolved, with slight warming, in 100 ml. methanol. The violet-coloured solution is combined with a solution of 49.6 g. (0.2 mol) 2,2'-dihydroxy-5,5'-dimethyl-diphenyl sulphide in 100 ml. methanol, whereby a pink coloured precipitate separates out which is filtered off after a few minutes and washed with methanol. After drying in a vacuum at 70° C., there are obtained 39 g., corresponding to a yield of 71.5%, of the complex salt from 2 mol 2,2'-dihydroxy-5,5'-dimethyl-diphenyl sulphide and 1 mol cobalt.

Analysis.—C (percent): found, 60.85, 61.03; calculated, 61.30. Co (percent): found, 10.70, 10.80; calculated, 10.75.

EXAMPLE 2

A solution of 60 g. (0.156 mol) 2,2'-dihydroxy-5,5'-dicyclohexyl-diphenyl sulphide in 110 ml. methanol is mixed with a solution of 39.3 g. (0.165 mol) nickel acetate tetrahydrate in 150 ml. methanol, produced by slight warming, whereupon a greenish precipitate immediately separates which is filtered off with suction and washed with water several times. After drying at 70° C. in a vacuum, there are obtained 63 g., corresponding to a yield of 98.5%, of the complex salt from 2 mol 2,2'-dihydroxy-5,5'-dicyclohexyl-diphenyl sulphide and 1 mol nickel.

Analysis.—C (percent): found, 71.00, 71.50; calculated, 70.10. Ni (percent): found, 6.70, 6.80; calculated, 7.15.

If proceeding as stated above, but with the use of 30 g. (.078 mol) 2,2' - dihydroxy-5,5'-dicyclohexyl - diphenyl sulphide and 39.3 g. (0.165 mol) nickel acetate tetrahydrate then there are obtained 28 g., corresponding to a yield of 82% of theory, of a reaction product of the following composition:

C (percent): 69.62, 70.02; Ni (percent): 7.3, 7.6

EXAMPLE 3

31.8 g. (0.1 mol) mercuric acetate are dissolved in 100 ml. methanol, with slight warming. The solution is mixed with a solution of 55.6 g. (0.2 mol) 2,2'-dihydroxy-3,3',5,5'-tetramethyl-diphenyl sulphide in 170 ml. methanol, whereby a yellow precipitate immediately separates out which is subsequently filtered off with suction, washed with methanol and dried at 50° C. in a vacuum. There are obtained 38.5 g., corresponding to a yield of 52%, of the complex compound from 2 mol 2,2'-dihydroxy-3,3',5,5'-tetramethyl-diphenyl sulphide and 1 mol mercury in the form of a yellow powder of melting point 135 to 140° C., which splits off metallic mercury upon heating to elevated temperatures.

Analysis.—C (percent): found, 51.08, 51.31; calculated, 51.50. Hg (percent): found, 26.5, 26.7; calculated, 26.9.

EXAMPLE 4

A hot solution of 10.49 g. (0.052 mol) cupric acetate monohydrate in 400 ml. methanol is mixed with a solution of 24.6 g. (0.1 mol) 2,2'-dihydroxy-5,5'-dimethyl-diphenyl sulphide in 60 ml. methanol, whereby a brown precipitate is formed, which is subsequently filtered off with suction, washed with methanol and dried at 70° C. in a vacuum. 24.2 g., corresponding to a yield of 87.5%, of the complex compound from 2 mol 2,2'-dihydroxy-5,5'-dimethyl-diphenyl sulphide and 1 mol copper are obtained in the form of a pale brown powder.

Analysis.—C (percent): found, 61.70, 61.21; calculated, 60.7. Cu (percent): found, 11.3; calculated, 11.5.

EXAMPLE 5

51 g. cupric acetate monohydrate are dissolved, with warming, in a mixture of 75 ml. of a concentrated aqueous ammonia solution and 4500 ml. methanol. After filtering off small amounts of impurities, 4560 ml. of a clear, deep blue solution are obtained. 925 ml. of this solution (corresponding to 0.15 mol copper acetate) are mixed with a solution of 74 g. (0.3 mol) 2,2'-dihydroxy-5,5'-dimethyl-diphenyl sulphide in 200 ml. methanol, whereby a brown coloured precipitate separates out which is filtered off with suction, washed with methanol and subsequently dried. There are obtained 74 g., corresponding to a yield of 90%, of the complex compound from 2 mol 2,2'-dihydroxy-5,5'-dimethyl-diphenyl sulphide and 1 mol copper. The copper content is 10.8% (calculated 11.5%).

EXAMPLE 6

A solution of 12.5 g. cupric sulphate pentahydrate (0.025 mol) in 50 ml. water is added, with stirring, to a solution of 12.3 g. (0.05 mol) 2,2'-dihydroxy-5,5'-dimethyl-diphenyl sulphide in 100 ml. methanol, whereby a brown precipitate is formed. The suspension obtained is mixed with 800 ml. water, the precipitate filtered off, well washed with water and subsequently dried. There are obtained 11.0 g. of the complex compound from 2 mol 2,2'-dihydroxy-5,5'-dimethyl-diphenyl sulphide and 1 mol copper. The yield is 79%.

EXAMPLE 7

A mixture of 49.6 g. (0.2 mol) 2,2'-dihydroxy-5,5'-dimethyl-diphenyl sulphide, 20 g. cupric acetate monohydrate (0.1 mol) and 1200 ml. methanol is heated at boiling temperature for 2 hours, with stirring. The reaction mixture is then filtered and the solution allowed to cool. The separated precipitate is thereafter filtered off with suction and dried at 70° C. in a vacuum. There are obtained 51 g., corresponding to a yield of 93%, of the complex compound from 2 mol 2,2'-dihydroxy-5,5'-dimethyl-diphenyl sulphide and 1 mol copper in the form of a yellow-brown powder.

Analysis.—C (percent): found, 60.38, 60.7; calculated, 60.7. Cu (percent): found, 11.5; calculated, 11.5.

EXAMPLE 8

2.6 g. (0.013 mol) cupric acetate monohydrate are dissolved, with warming, in a mixture of 5 ml. of a concentrated ammonia solution and 100 ml. methanol. The solution obtained is combined with a solution of 10 g. (0.026 mol) 2,2'-dihydroxy-5,5'-dicyclohexyl - diphenyl sulphide in 100 ml. methanol, whereby a brown coloured precipitate separates out. This is filtered off with suction, washed with water and dried at 70° C. in a vacuum. There are obtained 7 g. of the complex compound from 2 mol 2,2'-dihydroxy-5,5'-dicyclohexyl-diphenyl sulphide and 1 mol copper.

Analysis.—C (percent): found, 70.16, 70.46; calculated, 69.8. Cu (percent): found, 7.3, 7.4; calculated, 7.69.

EXAMPLE 9

A solution of 10 g. (0.055 mol) cupric acetate monohydrate in a mixture of 5 ml. of a concentrated aqueous ammonia solution and 300 ml. methanol is mixed with a solution of 22.1 g. (0.05 mol) 2,2'-dihydroxy-5,5'-diisooctyl-diphenyl sulphide in 200 ml. methanol. The precipitate obtained is filtered off and dried. There are obtained 20.0 g., corresponding to a yield of 84%, of the complex compound from 2 mol 2,2'-dihydroxy - 5,5' - diisooctyl-diphenyl sulphide and 1 mol copper. By concentration of the filtrate, a further 2 g. of the complex compound are obtained. It is soluble in hydrocarbons, such as toluene and dissolves with a red-brown colour.

Analysis.—C (percent): found, 70.4; calculated, 71.0. Cu (percent): found, 6.7; calculated, 6.8.

EXAMPLE 10

6 g. cupric acetate monohydrate (0.0335 mol) are dissolved at reflux temperature in 300 ml. methanol. The hot solution is added to a solution of 27.5 g. (0.1 mol) 2,2'-dihydroxy-3,3',5,5'-tetramethyl-diphenyl sulphide in 200 ml. methanol. A deep brown coloration immediately takes place. After a short time, black-violet coloured crystals separate out. These are filtered off with suction and washed with a little methanol. After drying at 70° C. in a vacuum, 15.3 g. of the complex compound from 2 mol 2,2'-dihydroxy-3,3',5,5'-tetramethyl-diphenyl sulphide and 1 mol copper are obtained of melting point 194° C. The yield is 75%.

Analysis.—C (percent): found, 62.4, 62.95; calculated 63.0. Cu (percent): found, 10.1; calculated, 10.4.

By the addition of water, there are recovered from the filtrate 11.5 g. of unchanged 2,2'-dihydroxy-3,3',5,5'-tetramethyl-diphenyl sulphide.

The complex compound dissolves in toluene and ether with a deep violet colour. It is slightly soluble in methanol and insoluble in water and white spirit.

EXAMPLE 11

10 g. (0.05 mol) cupric acetate monohydrate are dissolved by briefly boiling in a mixture of 10 ml. of a concentrated ammonia solution and 400 ml. methanol. The clear blue solution is combined with a solution of 27.5 g. (0.1 mol) 2,2'-dihydroxy-3,3',5,5'-tetramethyl-diphenyl sulphide in 200 ml. methanol. The solution is subsequently concentrated to half its volume by evaporation. The separated black-violet, lustrous crystals are then filtered off with suction. 27.3 g., corresponding to a yield of 90.5%, of the complex compound from 2 mol 2,2'-dihydroxy-3,3',5,5'-tetramethyl-diphenyl sulphide and 1 mol copper are obtained of melting point 194° C.

EXAMPLE 12

A warm solution of 56 g. (0.28 mol) cupric acetate monohydrate in a mixture of 3000 ml. methanol and 28 ml. of a concentrated aqueous ammonia solution is combined with a solution of 200 g. (0.56 mol) 2,2'-dihydroxy-3,3'-dimethyl-5,5'-di-tert-butyl-diphenyl sulphide in 200 ml. methanol, whereby a dark brown coloration occurs. Upon standing for a few hours at room temperature, deep violet coloured crystals separate out which are subsequently filtered off and dried. 32 g. and, by concentration of the mother liquor, a further 56 g., corresponding to a total yield of 41% of the complex compound from 2 mol 2,2'-dihydroxy-3,3'-dimethyl-5,5'-di-tert. - butyl - diphenyl sulphide and 1 mol copper are obtained, of melting point 190° C. The copper content is 8.15% (calculated 8.18%).

EXAMPLE 13

A solution of 28.7 g. (0.1 mol) 2,2'-dihydroxy-5,5'-dichloro-diphenyl sulphide in a mixture of 100 ml. methanol and 5 ml. of a concentrated aqueous ammonia solution is mixed with a solution of 12.5 g. (0.5 mol) cupric sulphate pentahydrate in 60 ml. methanol, whereby a brown precipitate immediately separates out. This is filtered off with suction, well washed with water and dried at 70° C. in a vacuum. There are obtained 29 g., corresponding to a yield of 87%, of the complex compound from 2 mol 2,2'-dihydroxy-5,5'-dichloro-diphenyl sulphide and 1 mol copper. The copper content is 9.9% (calculated 9.95%).

We claim:

1. In the process for the production of nickel, copper, cobalt or mercury compounds of bis-(o-hydroxyaryl) sulfides by the direct reaction of such a sulfide with a salt of the desired metal, the improvement according to which the reaction is carried out in a medium which is essentially methanol, the reactants are in the proportion of about 2 mols of the sulfide for every mol of the metal, and are in concentrations that directly produce a large yield of product that requires no purification.

2. The combination of claim 1 in which the compound is a copper compound and the metal salt is a copper-ammonia salt.

3. The combination of claim 1 in which the metal salt is a nickel salt.

4. The combination of claim 1 in which the metal salt is a cobalt salt.

5. The combination of claim 1 in which the metal salt is a mercury salt.

References Cited

Zeit. für Naturforschung 5b, pp. 190–195 (1950).

TOBIAS E. LEVOW, Primary Examiner.

H. M. S. SNEED, Assistant Examiner.